(12) United States Patent
Sakurai

(10) Patent No.: US 10,935,727 B2
(45) Date of Patent: Mar. 2, 2021

(54) TUNABLE FILTER

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 16/791,793

(22) Filed: Feb. 14, 2020

(65) Prior Publication Data

US 2020/0249399 A1  Aug. 6, 2020

(30) Foreign Application Priority Data

Jan. 31, 2019  (JP) .............................. JP2019-016107

(51) Int. Cl.
| | |
|---|---|
| *G02B 6/293* | (2006.01) |
| *G02B 6/42* | (2006.01) |
| *G02B 6/35* | (2006.01) |
| *G02B 6/28* | (2006.01) |

(52) U.S. Cl.
CPC ....... *G02B 6/2931* (2013.01); *G02B 6/29368* (2013.01); *G02B 6/3512* (2013.01); *G02B 6/4298* (2013.01); *G02B 6/283* (2013.01)

(58) Field of Classification Search
None
See application file for complete search history.

(56) References Cited

U.S. PATENT DOCUMENTS 7,346,234 B2 *  3/2008  Davis ................. G02B 6/29311
                                                              385/15
2008/0085119 A1    4/2008  Ye et al.

FOREIGN PATENT DOCUMENTS

JP          2008-203508 A      9/2008

* cited by examiner

*Primary Examiner* — Jerry Rahll
(74) *Attorney, Agent, or Firm* — Osha Bergman Watanabe & Burton LLP

(57) ABSTRACT

A variable wavelength filter includes: an input optical fiber; a diffraction grating that disperses input light from the input optical fiber; a variable mirror that has a reflective surface, wherein an angle of the reflective surface is adjustable, the variable mirror reflects the input light dispersed by the diffraction grating, the input light reflected by the variable mirror passes through a normal optical path, the input light that passes through the normal optical path has a wavelength band defined based on the angle of the reflective surface, and the defined wavelength band has a center wavelength corresponding to the angle of the reflective surface; an output optical fiber that outputs a portion of the input light that has passed through the normal optical path; and an optical detector disposed on a propagation path of the input light from the input optical fiber to the output optical fiber.

6 Claims, 7 Drawing Sheets

TUNABLE FILTER

TECHNICAL FIELD

The present disclosure relates to a variable wavelength filter.

BACKGROUND ART

Conventionally, an optical communication network is known that uses wavelength division multiplex (WDM) optical communication art. An optical amplifier is disposed in this optical communication network to compensate for transmission loss of optical fiber. For example, an erbium doped optical fiber amplifier (EDFA) is used as the optical amplifier.

In the optical amplifier, amplified spontaneous emission (ASE) noise is added to the optical signal when amplifying an optical signal. ASE noise limits the transmission distance of the optical signal. Therefore, a variable wavelength filter is disposed on the optical communication network to remove ASE noise.

A variable wavelength filter provided with a diffraction grating (for example, see cited documents 1 and 2) is known as the variable wavelength filter. A variable wavelength filter provided with diffraction grating reflects input light dispersed by the diffraction grating using a mirror so that only a defined wavelength component included in the input light is input into the output optical fiber. The mirror is configured to be capable of changing (i.e., adjusting) the angle of the reflective surface. The wavelength range bound to the output optical fiber changes when the angle of the reflective surface is adjusted.

The passing band of a variable wavelength filter changes due to temperature. It also slightly changes over time due to the external environment. Therefore, conventionally, the intensity of light that has passed through a variable wavelength filter is detected using an optical detector, and the angle of the reflective surface is adjusted based on the detected light intensity. For example, the angle of the reflective surface in a variable wavelength filter is adjusted so that the intensity of an optical signal detected by the optical detector is as high as possible. Therefore, the center wavelength of the variable wavelength filter is adjusted to match the wavelength of the optical signal.

Patent Literature

[Patent Literature 1] United States Patent Publication No. 2008/0085119
[Patent Literature 2] Japanese Unexamined Patent Application Publication No. 2008-203508

The size of an optical communication device in which a variable wavelength filter such as an optical transceiver is installed is limited by standards such as CFP, CFP2, and CFP4, which may require miniaturization of the optical communication device.

However, configurations wherein the optical detector is disposed in a separate device from the variable wavelength filter may hinder the miniaturization of the optical communication device. Additionally, methods wherein a portion of the optical signal is separated to detect the intensity thereof have a larger insertion loss of the entire optical communication device.

SUMMARY

One or more embodiments provide a variable wavelength filter that is suitable for the miniaturization of the optical communication device. Additionally, one or more embodiments provide a variable wavelength filter capable of suppressing insertion loss.

The variable wavelength filter according to one or more embodiments is provided with an input portion, a diffraction grating, a variable mirror, an output portion, and an optical detector. The diffraction grating disperses input light from the input portion. The variable mirror has a reflective surface capable of changing the angle thereof, wherein the input light dispersed by the diffraction grating is reflected.

The output portion outputs light from among the input light reflected by the variable mirror that has passed through a normal optical path and has a defined wavelength band having a center wavelength corresponding to the angle of the reflective surface. The optical detector is provided on a propagation path of the input light from the input portion to the output portion, and detects a light intensity of a portion of the input light.

According to a variable wavelength filter wherein the optical detector is installed internally, it is not necessary to dispose the optical detector in the optical communication device separately from the variable wavelength filter to adjust the passing band of the variable wavelength filter. Therefore, this variable wavelength filter facilitates the miniaturization of the optical communication device.

According to one or more embodiments, the optical detector may be disposed to receive light of a wavelength band separated from the center wavelength different from the defined wavelength band in the input light dispersed by the diffraction grating, and detect the light intensity thereof.

If a different wavelength band separated from the center wavelength of the wavelength band to be output, having a wavelength range that is at least partially different from the wavelength band to be output from the variable wavelength filter is used to detect the light intensity of input light, insertion loss of the variable wavelength filter can be suppressed.

According to one or more embodiments, a separation element may be provided at a focal position whereat the light of the defined wavelength band on the normal optical path is condensed, the separation element being for guiding, to the optical detector, light of a wavelength band separated from the center wavelength near the light of the defined wavelength band.

On the focal position, the wavelength component included in the input light is thoroughly spatially separated. Therefore, the separation of the focal position makes it possible to use a wavelength band separate from the wavelength band to be output to detect the light intensity of the input light.

According to one or more embodiments, a reflective mirror may be provided on the normal optical path, having an aperture for allowing the light of the defined wavelength band to pass through. The reflective mirror may be configured to reflect light of a wavelength band separated from the center wavelength propagated outward in the radial direction of the aperture toward the optical detector.

According to one or more embodiments, on the normal optical path, a wavelength selection element may be provided for selectively reflecting, toward the output portion, light from among the input light reflected by the variable mirror that is of the defined wavelength band passing through the normal optical path. The optical detector may be configured to receive light of a wavelength band separated from the center wavelength not reflected by the wavelength selection element on a downstream side in a progression direction of the input light to the wavelength selection element.

According to one or more embodiments, the wavelength selection element may be configured such that reflectivity in a center region is higher than reflectivity in a surrounding region positioned around the center region, the surrounding region has a reflective surface that is permeable to the input light, and light of the defined wavelength band is reflected at a higher reflectivity the closer the wavelength component is to the center wavelength.

DETAILED DESCRIPTION

Exemplary embodiments of the present invention will be described below with reference to drawings.

Figure 1:
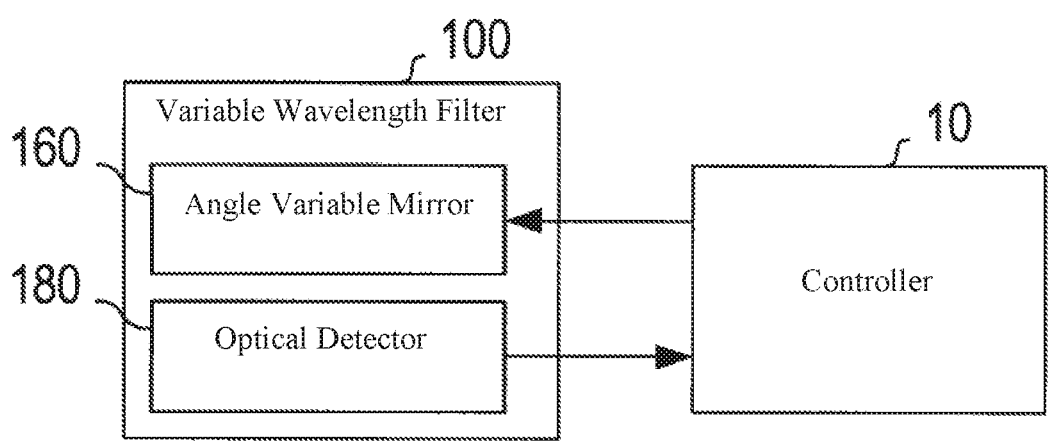
FIG. 1 is a block diagram illustrating a configuration of a device including a variable wavelength filter and a controller.

A variable wavelength filter 100 in one or more embodiments illustrated in FIG. 1 is controlled by a controller 10 and is configured to be capable of changing the passing band of wavelength. The variable wavelength filter 100 and the controller 10 are installed in an optical communication device.

Figure 2:
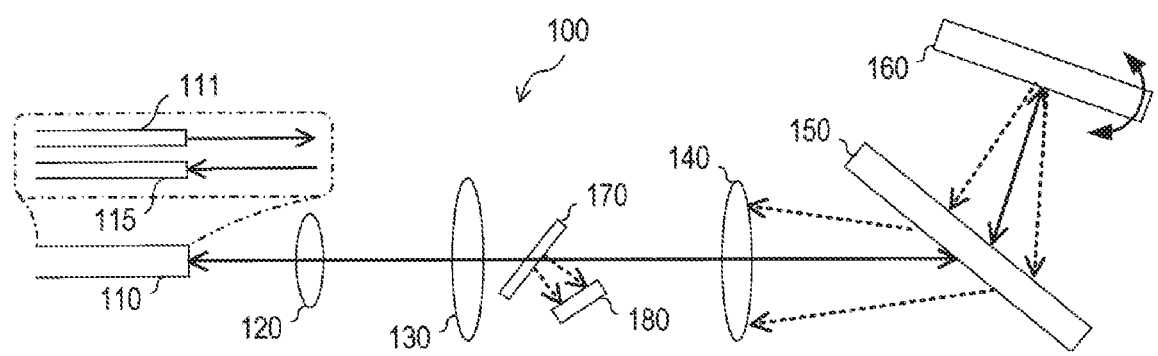
FIG. 2 is a block diagram illustrating a configuration of the variable wavelength filter of one or more embodiments.

As illustrated in FIG. 2, the variable wavelength filter 100 is provided with an input and output fiber 110, a collimator lens 120, a first beam shaping lens 130, a second beam shaping lens 140, a diffraction grating 150, an angle variable mirror 160, a separation filter 170, and an optical detector 180.

The input and output fiber 110 is provided with an input optical fiber 111 and an output optical fiber 115. The input optical fiber 111 and the output optical fiber 115 are disposed adjacent to each other in parallel. The input optical fiber 111 and the output optical fiber 115 illustrated as a dash-dot line in FIG. 2 indicate that they are aligned in a normal direction on the surface of the paper in FIG. 2.

The input optical fiber 111 is configured such that light transmitted from upstream is input into an internal space in the variable wavelength filter 100. The output optical fiber 115 is configured such that light that has passed through the internal space in the variable wavelength filter 100 is transmitted downstream.

Due to the controller 10 adjusting the passing band of the variable wavelength filter 100, the variable wavelength filter 100 operates to allow the passage of a signal component included in the input light from the input optical fiber 111 and block the passage of a noise component.

The input light from the input optical fiber 111 is propagated to the angle variable mirror 160 after passing through the collimator lens 120, the first beam shaping lens 130, the second beam shaping lens 140, and the diffraction grating 150 in this order.

The input light from the input optical fiber 111 is collimated in the collimator lens 120. In the first beam shaping lens 130 and the second beam shaping lens 140, the beam shape of the collimated input light is adjusted.

The input light having an adjusted beam shape passes through the diffraction grating 150 and is dispersed during this process. That is, the input light is propagated to the angle variable mirror 160 having the different wavelength components included in the input light spatially separated. Input light that has been dispersed in this manner is reflected on the angle variable mirror 160.

The arrows illustrated using a broken line in FIG. 2 conceptually illustrate the propagation of wavelength components from among the input light reflected by the angle variable mirror 160, not including the wavelength components in the passing band propagated downstream through the output optical fiber 115. The arrows illustrated using a solid line in FIG. 2 conceptually illustrate the propagation of wavelength components from among the input light that are in the passing band.

The input light reflected by the angle variable mirror 160 passes through the diffraction grating 150, the second beam shaping lens 140, the first beam shaping lens 130, and the collimator lens 120, and a portion of said light is input into the output optical fiber 115 and is propagated downstream.

That is, in relation to the input light reflected by the angle variable mirror 160, only a wavelength component of a defined wavelength band having a center wavelength based on the angle of the reflective surface of the angle variable mirror 160 passes through a normal optical path leading to the output optical fiber 115, is input into the output optical fiber 115, and is transmitted downstream. The defined wavelength band corresponds to the passing band of the variable wavelength filter 100.

The angle variable mirror 160 is configured as a micro-electro-mechanical-systems (MEMS) mirror, and is configured such that the angle of the reflective surface changes based on the applied voltage from the controller 10.

By adjusting the applied voltage to the angle variable mirror 160, the controller 10 adjusts the center wavelength of the passing band of the variable wavelength filter 100 to match the center wavelength of the signal component.

Figure 3:
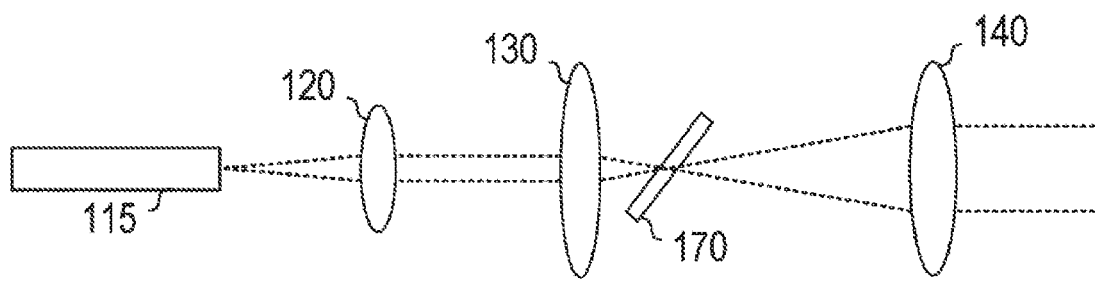
FIG. 3 is a diagram for describing that a separation filter is disposed on a focal position in accordance with one or more embodiments.

As illustrated in FIG. 3, the separation filter 170 is provided on a focal position between the first beam shaping lens 130 and the second beam shaping lens 140, specifically, a focal position whereat the wavelength component of the defined wavelength band propagated in the normal optical path is condensed. The broken lines illustrated in FIG. 3 conceptually illustrate the propagation of the wavelength component of the defined wavelength band.

The input light reflected by the angle variable mirror 160 is propagated spatially having a width due to dispersion, and is propagated farther from the normal optical path the more the wavelength component is separated from the center wavelength of the defined wavelength band. Wavelength components not including the defined wavelength band propagated in the vicinity of the normal optical path are isolated to be further spatially separated from the adjacent wavelength component of the defined wavelength band by the separation filter 170, and are guided to the optical detector 180.

Figure 4A:
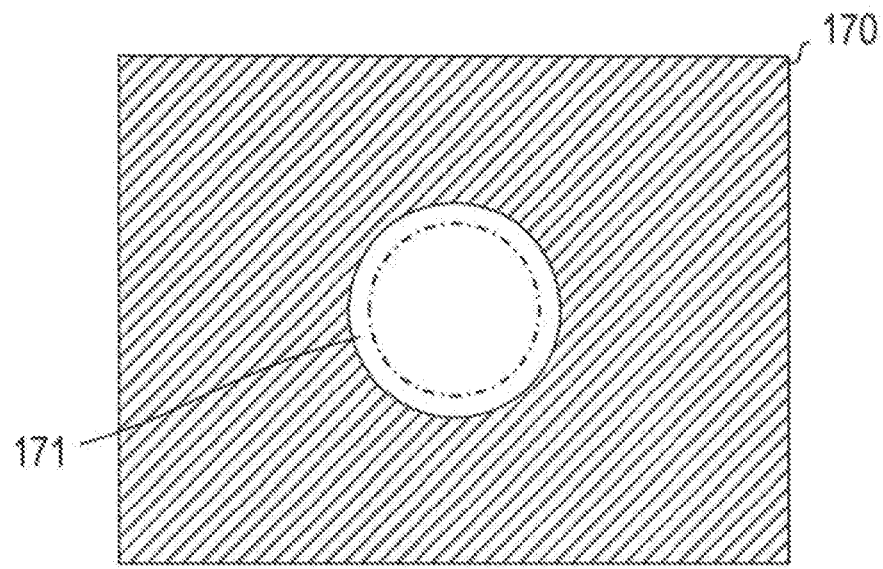
FIG. 4A is a diagram illustrating a configuration of the surface of a separation filter in accordance with one or more embodiments.
Figure 4B:
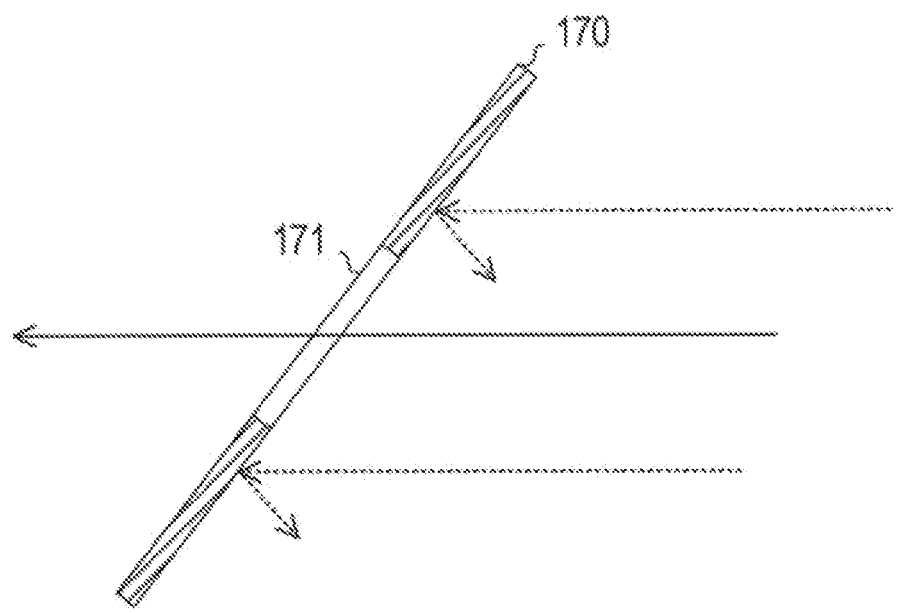
FIG. 4B is a diagram illustrating a cross-sectional configuration of the separation filter.

As illustrated in FIG. 4A and FIG. 4B, the separation filter 170 is configured as a reflective mirror having an aperture 171 that the wavelength component of the defined wavelength band propagated in the normal optical path can pass through to the output optical fiber 115.

FIG. 4A is a diagram for describing the configuration of the surface of the separation filter 170 facing the second beam shaping lens 140 side, and the surface region of the separation filter 170 hatched in FIG. 4A corresponds to the light reflecting region.

The aperture 171 is provided in the center of the separation filter 170. The aperture 171 has a diameter corresponding to the beam diameter of the defined wavelength band at the focal position (illustrated as a dash-dot line in FIG. 4A). The aperture 171 is configured as a hole or a transparent window through which light can pass as illustrated in FIG. 4B.

Due to the configuration above, the separation filter 170 functions to allow the wavelength component of the defined wavelength band passing through the interior of the aperture 171 to pass through to the output optical fiber 115 side and reflect light of a wavelength band separated from the center wavelength of the defined wavelength band propagating outward in the radial direction of the aperture 171.

Similar to FIG. 2, the solid line arrow in FIG. 4B conceptually illustrates the propagation of the wavelength component of the defined wavelength band, and the broken line arrow in FIG. 4B conceptually illustrates the propagation of wavelength components other than the defined wavelength band guided to the optical detector 180.

Figure 5:
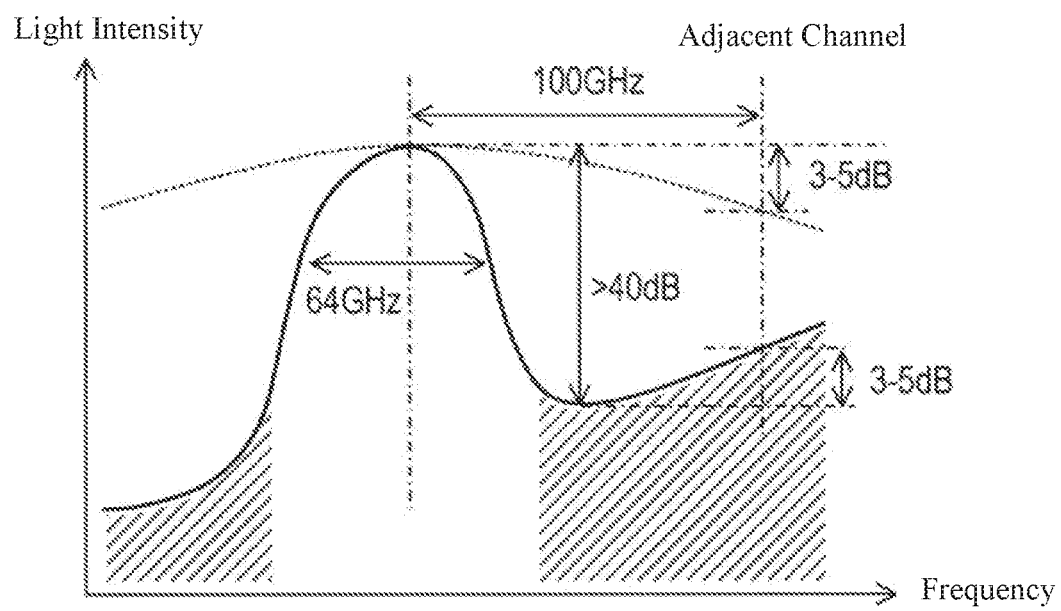
FIG. 5 is a graph showing the frequency spectrum and filter characteristics of the light handled by the variable wavelength filter of one or more embodiments.

In FIG. 5, the frequency spectrum of light in a 1 wavelength 400 Gbps WDM network is illustrated as a solid line on a graph having frequency on the horizontal axis. A 400 Gbps signal that has undergone multi-level modulation at 64 Gbound occupies nearly the same band of a width of 64 GHz on the frequency axis. When this signal is amplified by the optical amplifier and transmitted, the SN ratio of another WDM signal deteriorates because ASE noise is added to the other WDM signal.

When input light having ASE noise added is filtered by the variable wavelength filter 100, the filter characteristics take a gaussian shape as illustrated as a broken line in FIG. 5 when filtered utilizing dispersion by the diffusion grating 150. According to these gaussian shape filter characteristics, it is possible to decrease the noise component corresponding to the adjacent channel 40 dB or more when compared to the signal component at a channel spacing of 100 GHz.

In one or more embodiments, the separation filter 170 also guides the noise component not including the signal component included in the input light, specifically, the noise component including the ASE noise indicated by the hatching region in FIG. 5 to the optical detector 180. The controller 10 carries out a wavelength adjustment of the passing band of the variable wavelength filter 100 and the signal component based on the light intensity of the noise component detected by the optical detector 180.

The light intensity detected by the optical detector 180 is at a minimum value when the center wavelength of the passing band of the variable wavelength filter 100 and the center wavelength of the signal component accurately match, and the signal component of the input light therefore properly fits into the aperture 171. The larger the displacement amount of wavelength, the larger the light intensity detected by the optical detector 180.

Figure 6:
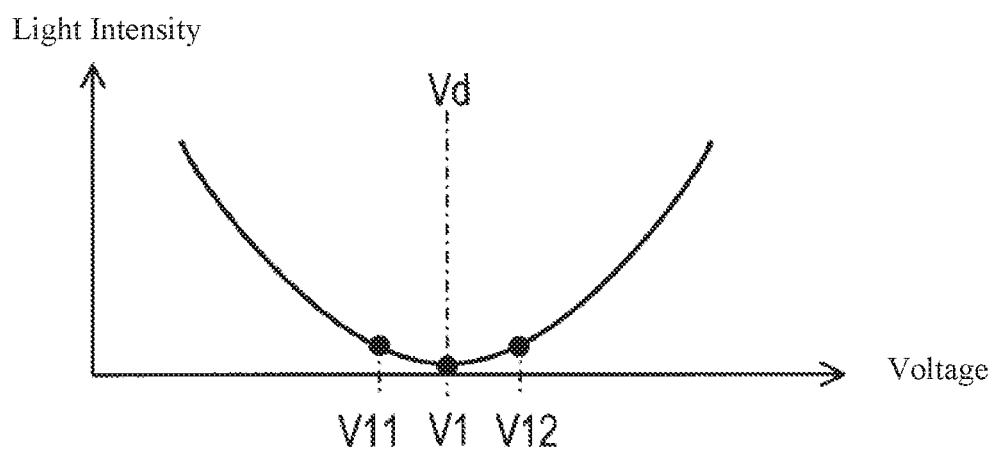
FIG. 6 is a diagram describing the relationship between detected light intensity and drive voltage of an angle variable mirror in accordance with one or more embodiments.

While changing the applied voltage to the variable wavelength filter 100 in an adjusting mode of the variable wavelength filter 100, the controller 10 defines the light intensity at each voltage based on a detection signal from the optical detector 180. As illustrated in FIG. 6, voltage V1, wherein a minimum light intensity is detected, is determined as a drive voltage Vd of the variable wavelength filter 100.

The controller 10 applies the drive voltage Vd determined in the adjusting mode to the variable wavelength filter 100 in a drive mode of the variable wavelength filter 100 to make the passing band of the variable wavelength filter 100 correspond to the signal component of the input light.

As another example, the controller 10 may determine the middle point between voltage V11 and V12 indicating the same light intensity defined from the detected light intensity at each voltage as the drive voltage Vd of the variable wavelength filter 100. Even in this case, the controller 10 may define a drive voltage Vd of the variable wavelength filter 100 wherein the center wavelength of the passing band of the variable wavelength filter 100 matches the center wavelength of the signal component.

As described above, the variable wavelength filter 100 in one or more embodiments has the optical detector 180 internally installed, and can make the passing band of the variable wavelength filter 100 match the wavelength of the signal component from the light intensity of the input light even if it does not provide an optical detector outside the variable wavelength filter 100.

Therefore, if the variable wavelength filter 100 in one or more embodiments is used, the optical communication device can be made smaller when compared to an optical communication device providing the optical detector outside the variable wavelength filter 100 to adjust the passing band of the variable wavelength filter 100.

Additionally, according to one or more embodiments, because the noise component not including the signal component included in the input light is utilized to detect the light intensity, and the passing band of the variable wavelength filter 100 is adjusted based on the detected light intensity, it is possible to suppress the insertion loss of the signal component in the variable wavelength filter 100.

Therefore, according to one or more embodiments, it is possible to provide a variable wavelength filter 100 that facilitates the suppression of insertion loss and the miniaturization of the optical communication device.

(1.1) Variation

In one or more embodiments described above, the separation filter 170 is disposed on the focal position between the first beam shaping lens 130 and the second beam shaping lens 140, and the wavelength component not including the defined wavelength band is guided to the optical detector 180 due to the functionality of the separation filter 170. However, the wavelength component not including the defined wavelength band may be guided to an optical detector 181 by providing a reflective film 115C on the end surface of the output optical fiber 115.

That is, the variable wavelength filter 100 in one or more embodiments may be modified to a configuration that is not provided with the separation filter 170 and the optical detector 180. Instead, the variable wavelength filter 100 in the present variation may be provided with the reflective film 115C on the tilted end surface of the output optical fiber 115.

Figure 7A:
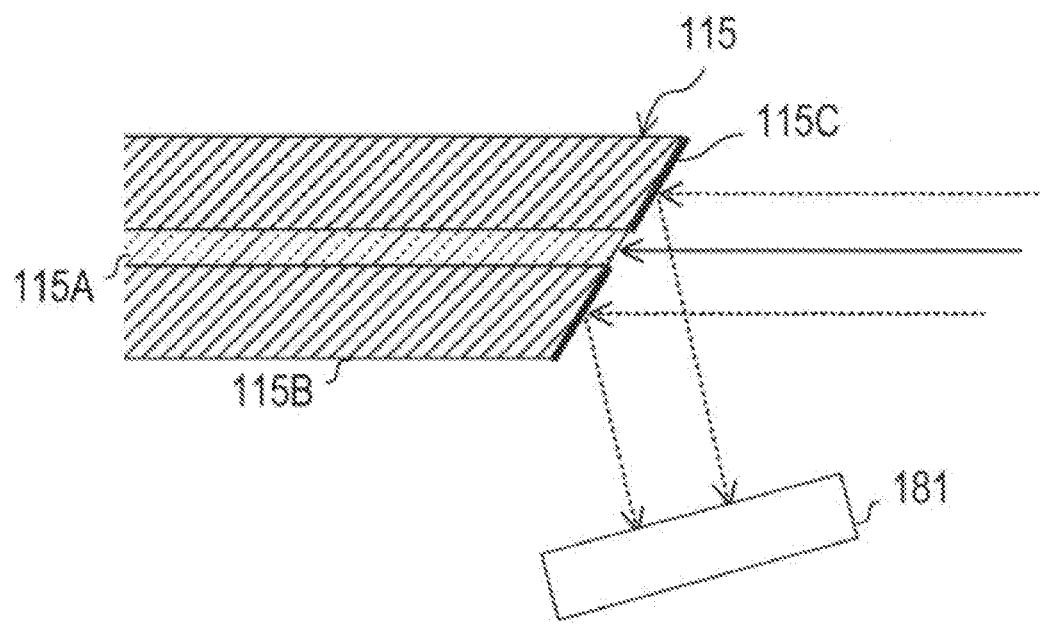
FIG. 7A is a cross-sectional diagram of an output optical fiber of a variation of one or more embodiments.
Figure 7B:
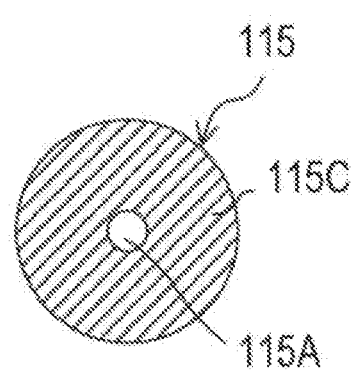
FIG. 7B is a planar view illustrating a configuration of an end surface of the output optical fiber.

In the variable wavelength filter 100 in the variation illustrated in FIG. 7A and FIG. 7B, the output optical fiber 115 is provided with the reflective film 115C on the end surface of a clad 115B around a core 115A. Additionally, the variable wavelength filter 100 in the variation is provided with the optical detector 181 that receives light of the wavelength component not including the defined wavelength band arriving from the reflective film 115C and detects the light intensity thereof.

The variable wavelength filter 100 in the variation is the same as one or more embodiments described above except that the reflective film 115C and the optical detector 181 are provided instead of the separation filter 170 and the optical detector 180, and that the wavelength component not including the defined wavelength band is separated on the focal position matching a different end surface of the output optical fiber 115 than one or more embodiments described above.

Similar to one or more embodiments described above, the controller 10 determines the voltage V1 wherein a minimum light intensity is detected as the drive voltage Vd of the variable wavelength filter 100 based on the detection signal from the optical detector 181, and therefore can make the passing band of the variable wavelength filter 100 correspond to the signal component of the input light.

Figure 8:
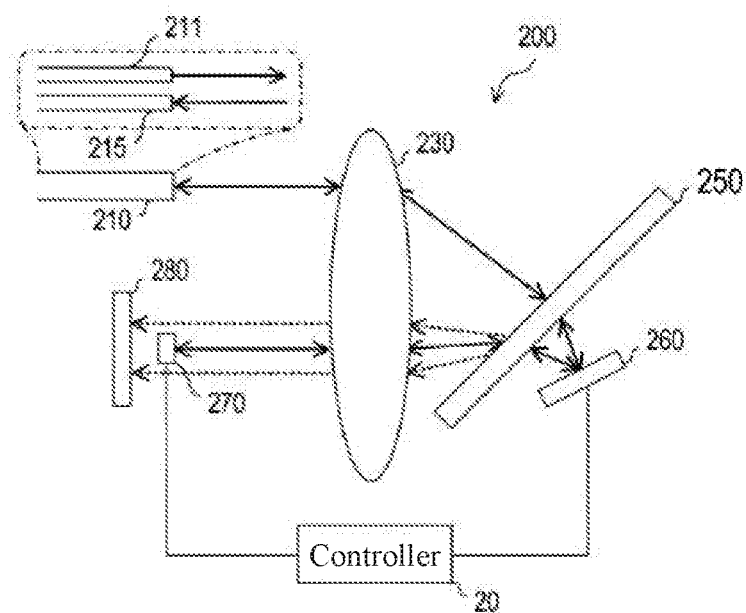
FIG. 8 is a block diagram illustrating a configuration of the variable wavelength filter of one or more embodiments.

The configuration of a variable wavelength filter 200 in one or more embodiments will be described. The variable wavelength filter 200 illustrated in FIG. 8 is provided with an input and output fiber 210, a beam shaping lens 230, a diffraction grating 250, an angle variable mirror 260, a wavelength selector (i.e., wavelength selection reflector) 270, and an optical detector 280.

The detection signal of light intensity by the optical detector 280 is input to the controller 20 connected to the variable wavelength filter 200. The controller 20 is configured to adjust the drive voltage Vd of the angle variable mirror 260 configured as a MEMS mirror based on the detection signal from the optical detector 280.

In the variable wavelength filter 200, similar to one or more embodiments described above, the input and output fiber 210 is provided with an input optical fiber 211 and an output optical fiber 215. The input optical fiber 211 and the output optical fiber 215 are disposed adjacent to each other in parallel. The input optical fiber 211 and the output optical fiber 215 illustrated as a dash-dot line in FIG. 8 indicate that they are aligned in a normal direction on the surface of the paper in FIG. 8.

The input optical fiber 211 is configured such that light transmitted from upstream is input into an internal space in the variable wavelength filter 200. The output optical fiber 215 is configured such that light that has passed through the internal space in the variable wavelength filter 200 is transmitted downstream.

The input light from the input optical fiber 211 is propagated to the angle variable mirror 260 after passing through the beam shaping lens 230 and the diffraction grating 250 in this order. The input light having an adjusted beam shape due to the beam shaping lens 230 passes through the diffraction grating 250 and is dispersed during this process. Input light that has been dispersed in this manner is reflected on the angle variable mirror 260.

Similar to FIG. 2, the arrows illustrated using a broken line in FIG. 8 conceptually illustrate the propagation of wavelength components from among the input light reflected by the angle variable mirror 260, not including the wavelength components in the passing band propagated downstream through the output optical fiber 215. The arrows illustrated using a solid line in FIG. 8 conceptually illustrate the propagation of wavelength components from among the input light that are in the passing band.

The input light reflected by the angle variable mirror 260 passes through the diffraction grating 250 and the beam shaping lens 230 and is propagated to the region where the wavelength selector 270 and optical detector 280 are disposed. The optical detector 280 is positioned further downstream in the progression direction of the input light than the wavelength selector 270.

The wavelength selector 270 is disposed on the normal optical path on which the wavelength component of the defined wavelength band corresponding to the passing band of the variable wavelength filter 200 is propagated, and functions to selectively reflect the wavelength component of the defined wavelength band being propagated on the normal optical path.

The input light reflected by the angle variable mirror 260 is propagated spatially having a width due to dispersion, and is propagated separated farther from the normal optical path the more the wavelength component is separated from the center wavelength of the defined wavelength band. The wavelength component separated from the center wavelength of the defined wavelength band propagated in the vicinity of the normal optical path does not collide with the wavelength selector 270, and is received by the optical detector 280 after passing around the perimeter of the wavelength selector 270.

The wavelength component of the defined wavelength band reflected by the wavelength selector 270 is propagated to the angle variable mirror 260 after yet again passing through the beam shaping lens 230 and the diffraction grating 250. Additionally, the wavelength component of the defined wavelength band is reflected by the angle variable mirror 260, passes through the beam shaping lens 230, is input into the output optical fiber 215, and is transmitted downstream.

Figure 9:
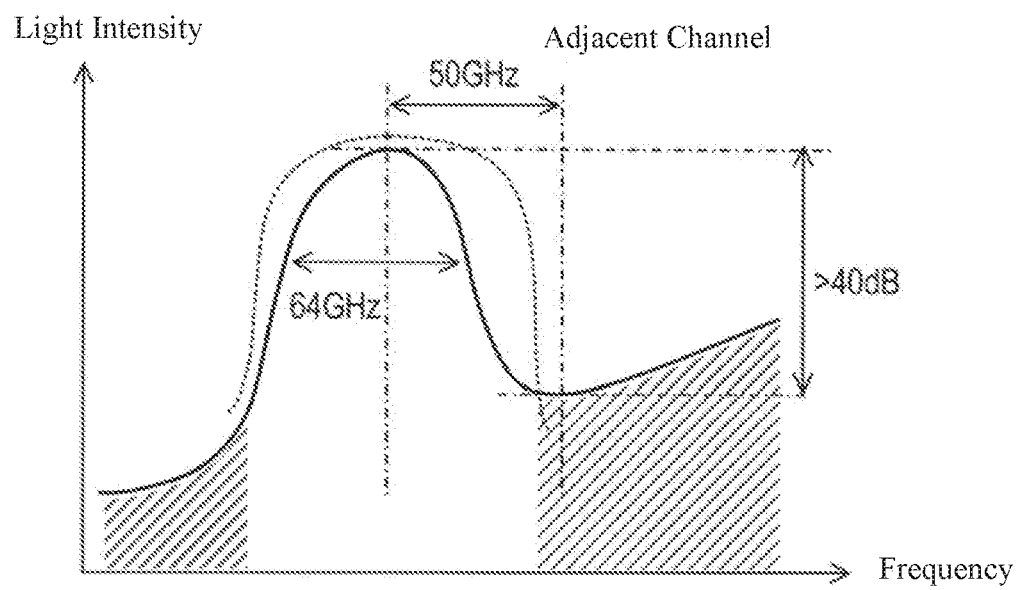
FIG. 9 is a graph showing the frequency spectrum and filter characteristics of the light handled by the variable wavelength filter of one or more embodiments.

FIG. 9 illustrates the frequency spectrum of light in a WDM network similar to that in FIG. 5 and filter characteristics of the variable wavelength filter 200 on a graph having frequency on the horizontal axis.

The variable wavelength filter 200, which uses the wavelength selector 270 to remove the ASE noise included in the input light, shows filter characteristics of a top hat shape having a passing bandwidth corresponding to the size of the wavelength selector 270. According to this top hat shape filter characteristic illustrated as a broken line in FIG. 9, it is possible to decrease the noise component corresponding to the adjacent channel 40 dB or more when compared to the signal component at a channel spacing of 50 GHz.

As described above, the noise component not including the signal component included in the input light is propagated to the optical detector 280 without being reflected by the wavelength selector 270. The controller 20 carries out a wavelength adjustment of the passing band of the variable wavelength filter 200 and the signal component based on the light intensity detected by the optical detector 280.

Similar to one or more embodiments described above, the light intensity detected by the optical detector 280 is at a minimum when the center wavelength of the passing band of the variable wavelength filter 200 and the center wavelength of the signal component accurately match, and the signal component of the input light therefore surely fits onto the reflective surface of the wavelength selector 270. The larger the wavelength displacement, the larger the light intensity detected by the optical detector 280.

Figure 10:
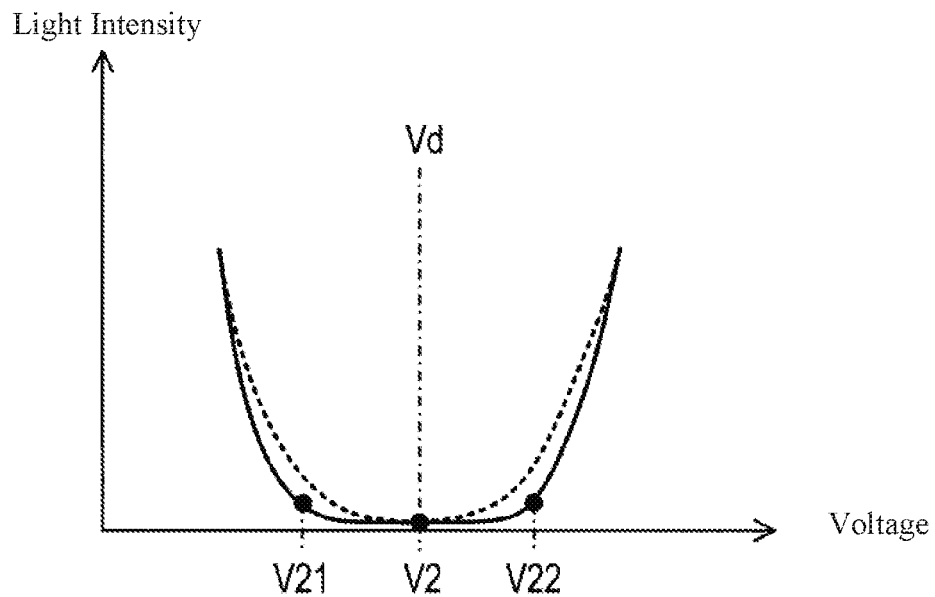
FIG. 10 is a diagram describing the relationship between detected light intensity and drive voltage of an angle variable mirror in accordance with one or more embodiments.

While changing the applied voltage to the variable wavelength filter 200 in an adjusting mode of the variable wavelength filter 200, the controller 20 defines the light intensity at each voltage based on a detection signal from the optical detector 280. As illustrated in FIG. 10, a middle point V2 between voltage V21 and V22 indicating the same light intensity defined from the detected light intensity at each voltage is determined as the drive voltage Vd of the variable wavelength filter 200.

The controller 20 applies the drive voltage Vd determined in the adjusting mode to the variable wavelength filter 200 in a drive mode of the variable wavelength filter 200 to make the passing band of the variable wavelength filter 200 correspond to the signal component of the input light.

In this manner, the variable wavelength filter 200 in one or more embodiments is a top hat-shaped filter, and can transmit to the output optical fiber 215 after appropriately removing the noise component included in the input light from the input optical fiber 211.

Additionally, the variable wavelength filter 200 has the optical detector 280 internally installed, and can make the passing band of the variable wavelength filter 200 match the optical signal from the light intensity of the input light even if it does not provide an optical detector outside the variable wavelength filter 200. Therefore, if the variable wavelength filter 200 in one or more embodiments is used, the optical communication device can be made smaller, similar to one or more embodiments described above.

Similar to one or more embodiments described above, because the noise component not including the signal component included in the input light is utilized to detect the light intensity, and the passing band of the variable wavelength filter 200 is appropriately adjusted based on the detected light intensity, it is possible to suppress the insertion loss of the signal component. Therefore, according to one or more embodiments, it is possible to provide a variable wavelength filter 200 that facilitates the suppression of insertion loss and the miniaturization of the optical communication device.

(2.1) Variation

In one or more embodiments, as illustrated in FIG. 10, the change in light intensity detected in the optical detector 280 is small when compared to the change in applied voltage around the minimum value because the variable wavelength filter 200 has a filter characteristic of a top hat shape. Therefore, even if the drive voltage Vd of the angle variable mirror 260 is determined using the method described above, a high precision wavelength adjustment of the passing band of the variable wavelength filter 200 and the signal component may not be possible.

Figure 11:
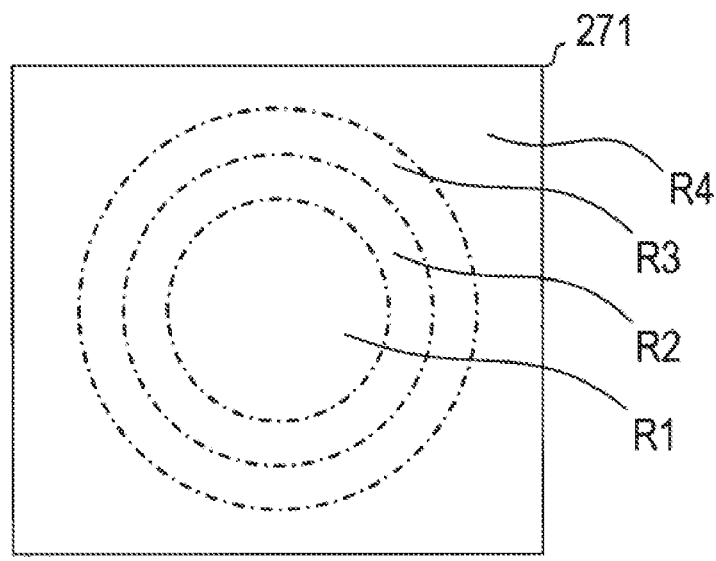
FIG. 11 is a diagram illustrating a configuration of a wavelength selector in a variation in accordance with one or more embodiments.

Therefore, the variable wavelength filter 200 in one or more embodiments may be modified to be provided with a wavelength selector 271 illustrated in FIG. 11 instead of the wavelength selector 270 to improve the precision of wavelength adjustment.

With the wavelength selector 271 in the variation, the surface facing the side opposite the optical detector 280 is configured as a reflective surface having nonuniform reflectivity, wherein the reflectivity is higher in regions closer to the center. A center region R1 of the wavelength selector 271, being a circle illustrated as a dash-dot line in FIG. 11 and illustrated as a circle having a minimum radius, is configured as a region having high reflectivity to reflect the entire signal component.

A first surrounding region R2 adjacent to the central region R1 illustrated as a circle surrounding the circumference of the center region R1 is configured as a region having lower reflectivity than the center region R1, wherein a portion of light incident to the first surrounding region R2 passes through toward the optical detector 280.

A second surrounding region R3 illustrated as a circle surrounding the circumference of the first surrounding region R2 is configured as a region having lower reflectivity and higher transmissivity than the first surrounding region R2. A remaining surrounding region R4 surrounding the second surrounding region R3 is configured as a region having lower reflectivity and higher transmissivity than the second surrounding region R3.

In this manner, according to the variable wavelength filter 200 in the variation, in which more of the wavelength component partially transmits through the wavelength selector 271 and is received by the optical detector 280 the farther the wavelength component is separated from the center wavelength of the passing band, the minimum point clearly appears in the distribution of light intensity in the optical detector 280. The distribution of light intensity illustrated as a broken line in FIG. 10 corresponds to the distribution of light intensity when using the wavelength selector 271.

Therefore, according to this variation, similar to one or more embodiments described above, the controller 20 can determine the voltage at which a minimum light intensity is detected to the drive voltage Vd of the variable wavelength filter 100 at an applied voltage to light intensity distribution (distribution illustrated as a broken line in FIG. 10) obtained by scanning the applied voltage to the variable wavelength filter 200.

According to this variation, in the variable wavelength filter 200 having a filter characteristic of a top hat shape, it is possible to adjust the center wavelength of the passing band to a center wavelength of the signal component included in the input light in higher precision, and it is possible to appropriately remove the noise component from the input light.

(3) Other

Above, configurations of the variable wavelength filters 100 and 200 in one or more embodiments were described, including variations. However, the present invention is not limited to these embodiments, and various aspects are possible.

For example, one or more embodiments described above includes the concept of utilizing the noise component not including the signal component included in the input light to adjust the drive voltage Vd of the angle variable mirrors 160 and 260. However, this adjustment may be implemented by detecting the light intensity of the signal component.

That is, the variable wavelength filters 100 and 200 may be configured to separate a portion of the signal component, guide the portion to the optical detectors 180 and 280, and adjust the drive voltage Vd of the angle variable mirrors 160 and 260 based on the light intensity of this separated light.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE NUMERALS 10, 20 ... Controller, 100, 200 ... Variable wavelength filter, 110, 210 ... Input and output fiber, 111, 211 ... Input optical fiber, 115, 215 ... Output optical fiber, 115A ... Core, 115B ... Clad, 115C ... Reflective film, 120 ... Collimator lens, 130, 140, 230 ... Beam shaping lens, 150, 250 ... Diffraction grating, 160, 260 ... Angle variable mirror, 170 ... Separation filter, 171 ... Aperture, 180, 181, 280 ... Optical detector, 270, 271 ... Wavelength selector.

The invention claimed is:

1. A variable wavelength filter, comprising:
an input optical fiber;
a diffraction grating that disperses input light from the input optical fiber;
a variable mirror that has a reflective surface, wherein
an angle of the reflective surface is adjustable,
the variable mirror reflects the input light dispersed by the diffraction grating,
the input light reflected by the variable mirror passes through a normal optical path,
the input light that passes through the normal optical path has a wavelength band defined based on the angle of the reflective surface, and
the defined wavelength band has a center wavelength corresponding to the angle of the reflective surface;
a separation filter disposed at a focal position where the light of the defined wavelength band on the normal optical path is condensed;
an output optical fiber that outputs a portion of the input light that has passed through the normal optical path; and
an optical detector disposed on a propagation path of the input light from the input optical fiber to the output optical fiber,
wherein the optical detector detects a light intensity of a portion of the input light.

2. The variable wavelength filter according to claim 1, wherein
the optical detector receives and detects light of a wavelength band separated from the center wavelength, and
the wavelength band separated from the center wavelength is different from the defined wavelength band.

3. The variable wavelength filter according to claim 2, wherein
the separation filter guides the light of the wavelength band separated from the center wavelength to the optical detector.

4. The variable wavelength filter according to claim 2, further comprising: a reflective mirror on the normal optical path, wherein
the reflective mirror has an aperture that allows the light of the defined wavelength band to pass through,
the reflective mirror reflects the light of the wavelength band separated from the center wavelength, and
the light of the wavelength band separated from the center wavelength propagates outward in a radial direction of the aperture toward the optical detector.

5. A variable wavelength filter, comprising:
an input optical fiber;
a diffraction grating that disperses input light from the input optical fiber;
a variable mirror that has a reflective surface, wherein
an angle of the reflective surface is adjustable,
the variable mirror reflects the input light dispersed by the diffraction grating,
the input light reflected by the variable mirror passes through a normal optical path,
the input light that passes through the normal optical path has a wavelength band defined based on the angle of the reflective surface, and
the defined wavelength band has a center wavelength corresponding to the angle of the reflective surface;
an output optical fiber that outputs a portion of the input light that has passed through the normal optical path;
an optical detector disposed on a propagation path of the input light from the input optical fiber to the output optical fiber, wherein the optical detector detects a light intensity of a portion of the input light; and
a wavelength selection reflector disposed on the normal optical path, wherein
the wavelength selection reflector selectively reflects a portion of the light of the defined wavelength band reflected by the variable mirror and that passed through the normal optical path toward the output optical fiber, and
the optical detector receives the light of the wavelength band separated from the center wavelength that:
is not reflected by the wavelength selection reflector; and
propagates on a downstream side in a progression direction of the input light to the wavelength selection reflector.

6. The variable wavelength filter according to claim 5, wherein
reflectivity in a center region of the wavelength selection reflector is higher than reflectivity in a surrounding region of the wavelength selection reflector around the center region,
the surrounding region has a reflective surface that is permeable to the input light, and
the wavelength selection reflector reflects a wavelength component of the light of the defined wavelength band at a higher reflectivity the closer the wavelength component is to the center wavelength.

* * * * *